J. V. JURICEK.
TRAP.
APPLICATION FILED JULY 8, 1919.
1,315,510.
Patented Sept. 9, 1919.
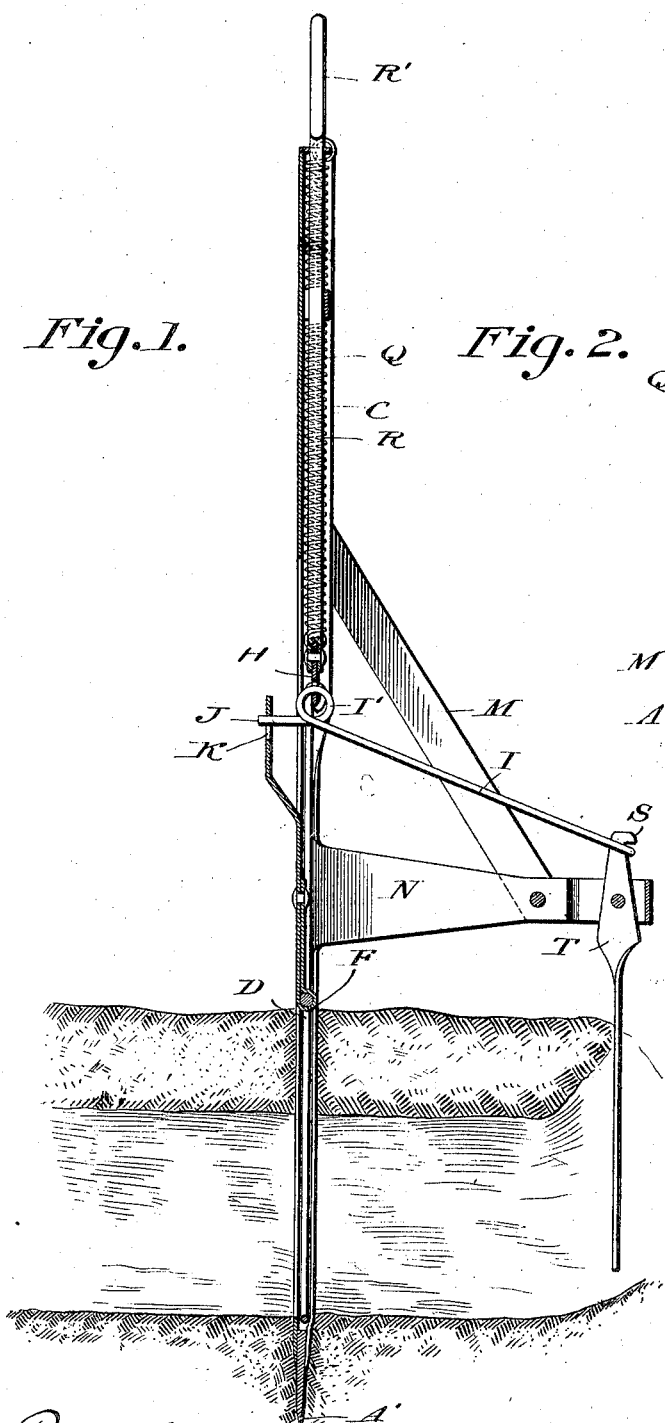
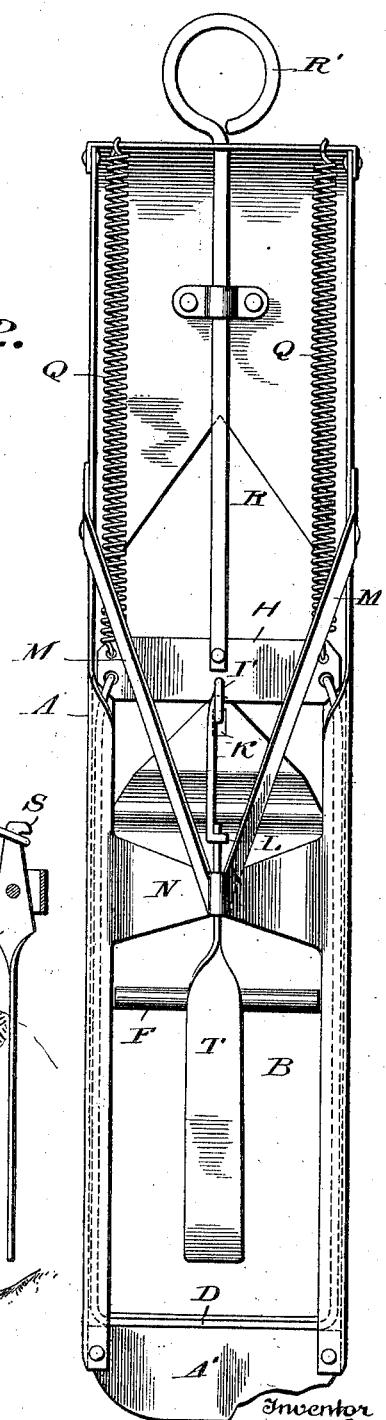

UNITED STATES PATENT OFFICE.

JOHN V. JURICEK, OF CRETE, NEBRASKA.

TRAP.

1,315,510.　　　　Specification of Letters Patent.　　Patented Sept. 9, 1919.

Application filed July 8, 1919. Serial No. 309,265.

*To all whom it may concern:*

Be it known that I, JOHN V. JURICEK, a citizen of the United States, residing at Crete, in the county of Saline and State of Nebraska, have invented certain new and useful Improvements in Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in traps especially designed for use in catching gophers and other animals, and consists essentially in the provision of a frame adapted to be inserted in the ground, around a burrow through which the animal may pass, and when coming in contact with the trigger, cause the trap to be sprung.

The invention consists of a simple and efficient device of this nature having various details of construction, combination and arrangement of parts which will be hereinafter fully described and then specifically defined in the appended claims.

I illustrate my invention in the accompanying drawings which, with the letters of reference marked thereon, form a part of this application, and in which:

Figure 1 is a vertical sectional view showing the trap as adjusted in place, and Fig. 2 is a face view.

Reference now being had to the details of the drawings by letter:

A designates a frame having a rectangular outlined opening B, the opposite walls of which are channeled as at C to receive the bail-shaped wire D, the cross piece of which is adapted, when the trap is sprung, to coöperate with the edge F of the frame to catch and strangle the animal. The ends of the wire forming the bail-shaped member D, are fastened to a cross bar H, which carries a trigger holding rod I, bent to form a loop I' engaging an aperture therein.

The short end of the trigger holding rod is designated by letter J, and the long arm is provided with a hook L at its end. A portion of the frame is bent laterally and provided with an aperture K, adapted to be engaged by the short end J of the trigger holding rod, when the trap is set as shown in the drawings.

Projecting from the frame is a lateral extension N braced as at M, and has pivotally mounted thereon a trigger T which is positioned in front of the opening in the lower portion of the trap, and against which the animal is adapted to contact to spring the trap. Said trigger has a hook S engaged by the hook L upon said rod when the trap is set.

Springs Q are fastened at their lower ends to the bar carrying said rod and their other ends to a flange of the frame and tending to normally hold the bail-shaped member at its highest limit. A rod R is fastened at its lower end to said bar and passes through an aperture in the flange about the frame and its top end has a loop R' at one end, forming a handle.

The lower end of the trap has a cutting edge A' whereby the device may be easily pushed down into the ground in order to bring the rectangular opening therein in registration with the channel through which the animal passes.

In setting the trap, the bail shaped member is pushed down by the handle and the short end of the rod made to engage the aperture in the frame, while the trigger engages the hooked end of the rod. When the trap is set the springs are under tension, and as the animal comes in contact with the trigger, the latter is tilted and disconnects from the hooked end of the rod, permitting the bail-shaped member to be quickly drawn up under the tension of the spring, gripping and strangling the animal, as will be readily understood.

What I claim to be new is:

1. A trap consisting of a frame with a longitudinally movable bail-shaped member therein, a bar secured to the ends of said member, springs connecting said bar and the flange of the frame, a rod pivoted to said bar and having one end designed to engage the hole in the frame and its other end hooked, a pivotal trigger supported on the frame and having a hook, adapted to interlock with a hook upon said rod to hold the trap set, and a handle secured to said bar.

2. A trap, consisting of a frame with a longitudinally movable bail-shaped member therein, a bar secured to the ends of said member, springs connecting said bar and the flange of the frame, a rod pivoted to said bar and having one end designed to engage the hole in the frame and its other end hooked, a pivotal trigger supported on the frame and having a hook, adapted to interlock with a hook upon said rod to hold the trap set, and a handle secured to said bar, the lower end of the trap being sharpened to permit the trap to be inserted in the ground.

In testimony whereof I hereunto affix my signature.

JOHN V. JURICEK.